United States Patent [19]
Mori

[11] Patent Number: 4,509,500
[45] Date of Patent: Apr. 9, 1985

[54] SOLAR ENERGY COLLECTION APPARATUS

[76] Inventor: Kei Mori, 3-16-3-501, Kaminoge, Setagaya-ku, Tokyo, Japan

[21] Appl. No.: 459,087

[22] Filed: Jan. 19, 1983

[30] Foreign Application Priority Data

Jan. 26, 1982 [JP] Japan ................. 57-10680

[51] Int. Cl.³ ................................ F24J 3/02
[52] U.S. Cl. ................... 126/425; 126/440; 126/443; 126/450
[58] Field of Search ............... 126/424, 425, 440, 443, 126/450; 52/80, 81; 250/203 R; 353/3; 350/242

[56] References Cited

U.S. PATENT DOCUMENTS

| | | | |
|---|---|---|---|
| 3,493,291 | 2/1970 | Webb | 126/440 X |
| 3,934,573 | 1/1976 | Dandini | 126/443 X |
| 3,998,204 | 12/1976 | Fuchs et al. | 126/415 |
| 4,136,670 | 1/1979 | Davis | 126/440 |
| 4,187,832 | 2/1980 | Tregoning | 126/443 |
| 4,223,174 | 9/1980 | Moeller | 126/425 X |
| 4,229,941 | 10/1980 | Hope | 126/443 X |
| 4,267,826 | 5/1981 | Hitt | 126/440 |
| 4,299,201 | 11/1981 | Tsubota | 126/440 |
| 4,341,203 | 7/1982 | Bloxsom | 126/440 |

FOREIGN PATENT DOCUMENTS

| 0043082 | 1/1982 | European Pat. Off. | 126/443 |
|---|---|---|---|
| 19549 | 2/1982 | Japan | 126/440 |

Primary Examiner—Margaret A. Focarino
Attorney, Agent, or Firm—Jordan and Hamburg

[57] ABSTRACT

A solar ray collection apparatus includes a capsule and a solar ray collector housed in the capsule. The solar ray collector is controlled to chase the sun in response to an output of a photodetector which may be located inside or outside the capsule. The capsule comprises a number of interconnected transparent members which are inclined by a specific angle which effects the most efficient collection of the solar energy at any position of the sun. The apparatus is excellent in mechanical strength and resistivity to wind due to unique configuration of each transparent member.

16 Claims, 7 Drawing Figures

SOLAR ENERGY COLLECTION APPARATUS

BACKGROUND OF THE INVENTION

The present invention relates to an apparatus for collecting solar rays and converting their energy into thermal or electric energy and, more particularly, to a solar energy collection apparatus which includes a transparent capsule for protecting its solar ray collector from wind, rain, dust and other undesirable surroundings.

A solar energy collection apparatus has to be positively proofed against various undesirable surroundings such as wind, rain and dust. This demand is usually satisfied by housing a solar ray collector of the apparatus in a generally spherical unitary body or capsule made of transparent material. A problem emerges here is that, when the solar ray collector is bulky, the capsule for accommodating the solar ray collector becomes large-sized and it is quite difficult to form such a large transparent unitary capsule.

A large-sized capsule may be formed by combining a number of transparent flat plates at random. This has still suffered from the drawback that the solar ray collection efficiency achievable with a solar ray collector housed in such a capsule is quite limited.

SUMMARY OF THE INVENTION

A solar energy collection apparatus embodying the present invention comprises a housing or capsule made up of a number of interconnected transparent members. Solar ray collectors means is installed within the capsule and includes a plurality of lenses. These lenses define a light receiving surface the peripheral edge of which contacts imaginary lines which define the range in which the solar rays are allowed to penetrate the capsule. With this construction, the solar rays are collected most effectively for a predetermined size of the capsule by the solar ray collector means.

In accordance with the present invention, a solar ray collection apparatus includes a capsule and a solar ray collector housed in the capsule. The solar ray collector is controlled to chase the sun in response to an output of a photodetector which may be located inside or outside the capsule. The capsule comprises a number of interconnected transparent members which are inclined by a specific angle which effects the most efficient collection of the solar energy at any position of the sun. The apparatus is excellent in mechanical strength and resistivity to wind due to unique configuration of each transparent member.

It is an object of the present invention to provide a solar energy collection apparatus which includes an improved polyhedral capsule to eliminate the drawback discussed above.

It is another object of the present invention to provide a large-sized solar energy collection apparatus which is capable of collecting solar rays with the best efficiency despite such a size of a polyhedral capsule.

It is another object of the present invention to provide a solar energy collection apparatus having an improved capsule which is made up of a plurality of wind-resisting and mechanically strong transparent members.

It is another object of the present invention to provide a generally improved solar energy collection apparatus.

Other objects, together with the foregoing, are attained in the embodiments described in the following description and illustrated in the accompanying drawings.

DESCRIPTION OF THE PREFERRED EMBODIMENTS

While the solar energy collection apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
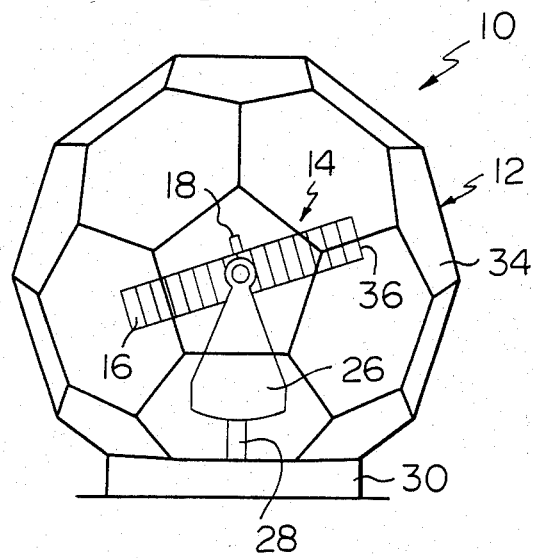
FIG. 1 is a schematic front view of a solar energy collection apparatus embodying the present invention.
Figure 2:
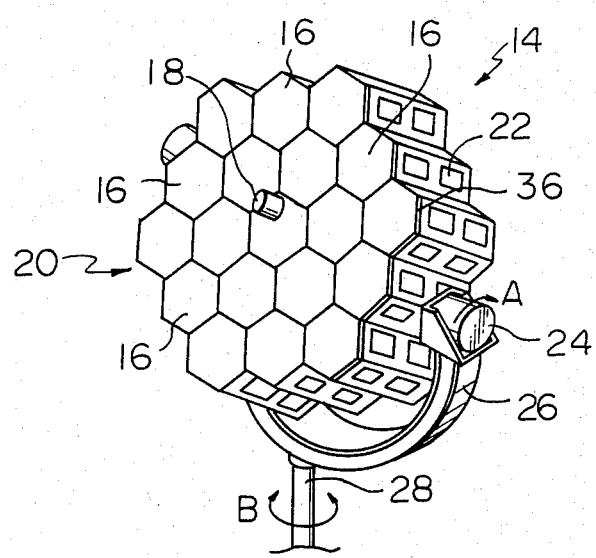
FIG. 2 is a perspective view of the apparatus shown in FIG. 1 with its capsule removed.

Referring to FIGS. 1 and 2 of the drawings, a solar energy collection apparatus of the present invention is shown and generally designated by the reference numeral 10. The apparatus 10 comprises a generally spherical transparent housing or capsule 12 and a solar ray collector 14 installed in the capsule 12. The solar ray collector 14 includes a number of, such as nineteen, lenses 16 adapted to converge the solar rays into photothermal or photoelectric converters (not shown) which are respectively located at the focal points of the lenses 16. A photodetector 18 is positioned at the center of a generally circular light receiving surface 20 which is defined by the lenses 16. The lenses 16 and photodetector 18 are integrally bundled up by a support frame or lens frame 22. A first drive unit such as a motor 24 drives the lens assembly in a direction indicated by an arrow A in FIG. 2. The lens assembly and motor 24 are integrally supported by a generally C-shaped arm 26 which is rigidly mounted on a rotary shaft 28. This shaft 28 extends perpendicular to the axis of rotation of the motor 24 and is driven in a direction indicated by an arrow B by a second drive unit such as a motor (not shown). The photodetector 18 senses a position of the sun at any time. The first and second motors are controlled in response to an output of the photodetector 18 such that the light receiving surface 20 of the lens assembly 16 constantly chases the sun. The solar rays are converged by the lenses 16 into their associated photothermal or photoelectric converters to be thereby transformed into thermal or electric energy. If desired, optical cables may be so located as to receive the converged sunlight at the focal points of the respective lenses 16 and transmit it to any desired location for a desired application.

Figure 3:
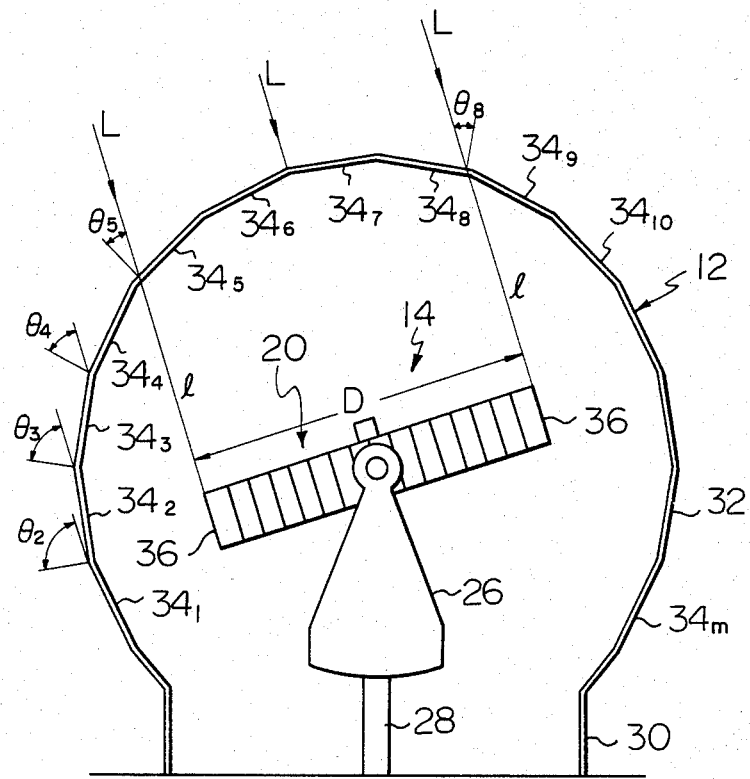
FIG. 3 is a sectional of the apparatus shown in FIG. 1.

As best shown in FIG. 3, the capsule 12 comprises a generally cylindrical base section 30 and a generally spherical or dome-shaped section 32 which emerges from the top of the base section 30. The dome 32 is made up of a plurality of interconnected pentagonal and hexagonal transparent plates $34_1, 34_2 \ldots 34_m$. The solar ray collector 14 is controlled to constantly face the sun at the light receiving surface 20 thereof, as previously described. Hence, when the solar rays are incident on the capsule 12 in the direction L as shown in FIG. 3, the incidence angle $\theta_2$ on the plate $34_2$, for example, is so large that the sunlight is not introduced into the capsule 12 but totally reflected by the plate $34_2$. Still, the incidence angle $\theta_3$ on the adjacent plate $34_2$ is smaller than the incidence angle $\theta_2$ and the incidence angle $\theta_4$ is even smaller than the incidence angle $\theta_3$. Therefore, at a certain incidence angle smaller than $\theta_2$, the sunlight is allowed to penetrate the capsule 12. It follows that the installation of the solar ray collector 14 will be most effective when its diameter D is so designed as to locate the peripheral edge 36 of the light receiving surface 20 at the position which the light of the specific incidence angle smaller than $\theta_2$ reaches. Stated another way, the most effective design of the capsule 12 will be such that supposing lines l which extend from the peripheral edge 36 perpendicularly to the light receiving surface 20, the plates $34_5$ and $34_8$ intersecting the lines l are inclined by angles $\theta_5$ and $\theta_8$ which have the maximum value within the allowable range for the penetration of the solar rays into the capsule 12.

With the above arrangement, the solar ray collector 14 inside the capsule 12 can collect the solar rays or energy in its most effective manner.

Figure 4:
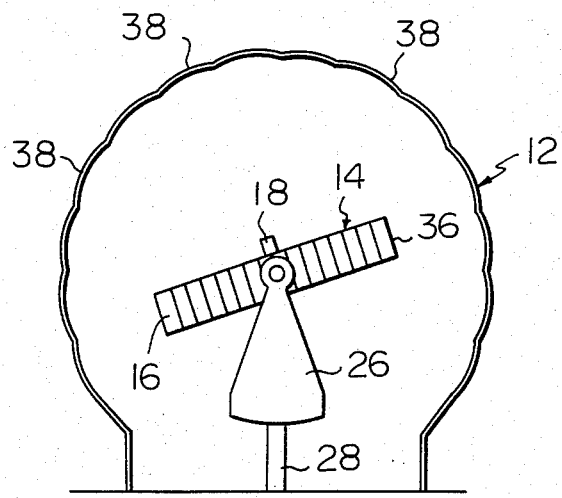
FIGS. 4 and 5 are sections showing other embodiments of the present invention.
Figure 5:
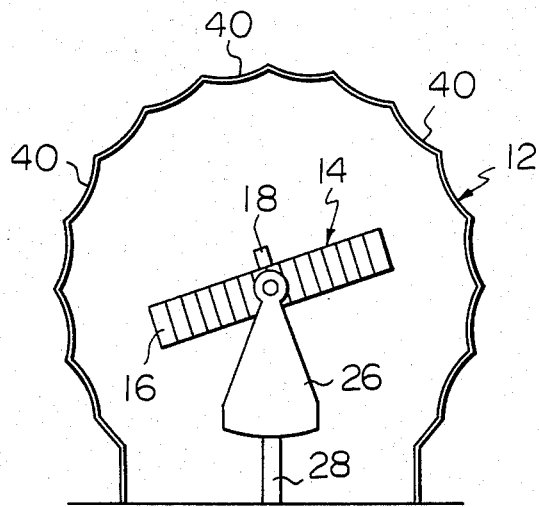

Referring to FIG. 4, another embodiment of the present invention is shown which is essentially similar to the first embodiment but different in the profile of the transparent plates of the capsule 12. In contrast to the flat profile of the plates 34, the plates 38 shown in FIG. 4 are individually formed slightly convex toward the outside. It will be seen that such a shape of the transparent plates 38 increases the mechanical strength of the capsule 12 and, therefore, permits the plates 38 to be formed thinner than the plates 34. Alternatively, the capsule 12 may be made up of transparent plates shown in FIG. 5 which are individually formed somewhat concave toward the outside. The capsule shown in FIG. 5 will prove particularly resistant to wind.

Apart from the described combination of pentagon and hexagon, the transparent plates may have any other suitable configuration in principle, such as triangle, circle, quadrangle, pentagon, hexagon, trapezoid and banana-shaped or a combination thereof. Still, the combined pentagonal and hexagonal plates can be effectively interconnected without any gap to enhance the resistivity of the resulting capsule 12 to wind.

Figure 6:
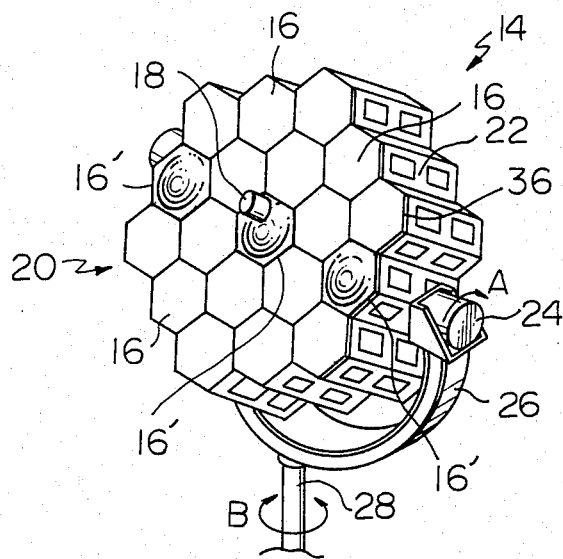
FIGS. 6 and 7 are perspective views of other different embodiments of the present invention.

Referring to FIG. 6, another embodiment of the present invention is shown which is similar to the construction shown in FIG. 2 but features a unique lens arrangement. Of the lenses 16 shown in FIG. 6, the lenses 16' intersecting the axis of rotation of the motor 24 have a profile which resembles a convex lens. With this arrangement, the focal point of each lens 16' is prevented from intersecting the axis of rotation of the motor 24.

Figure 7:
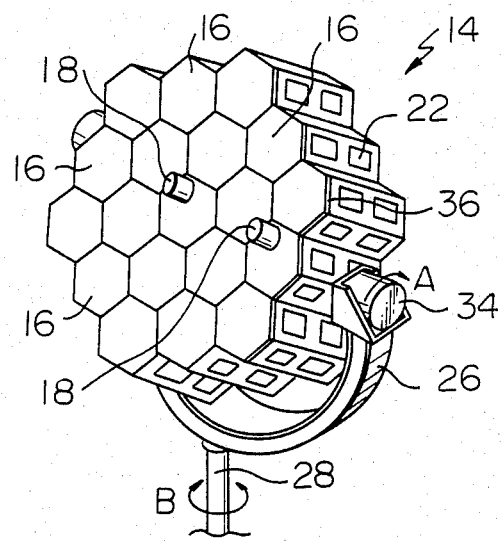

Referring to FIG. 7, still another embodiment of the present invention is shown which includes a plurality of photodetectors 18. While the single photodetector 18 in the foregoing embodiments will fail to properly operate when the joint between adjacent transparent plates of the capsule 12 becomes located just thereabove, either one of the photosensors 18 shown in FIG. 7 will always and accurately sense the sun even when the other fails in the situation mentioned above.

In summary, it will be seen that the present invention provides a large-sized solar energy collection apparatus which efficiently collects the solar energy despite the use of a capsule which is formed by numerous plates. Additionally a capsule of the apparatus is resistive to wind and excellent in mechanical strength.

Various modifications will become possible for those skilled in the art after receiving the teachings of the present disclosure without departing from the scope thereof. For example, the entire light receiving surface 20 of the lens assembly may be provided with a generally hemispherical configuration. The photodetector 18 may be replaced by a sun chasing unit located outside the capsule 12 and constructed to drive the solar ray collector 14 with its output.

What is claimed is:

1. A solar ray collection apparatus comprising:
   solar ray collector means for collecting the solar rays, said means including a plurality of lenses which define a light receiving surface; and
   a housing or capsule made up of a number of interconnected transparent members plates which are interconnected to enclose the solar ray collector means thereinside, said transparent plates being inclined at a plurality of different angles and being configured such that, when intersected by imaginary lines which extend from the peripheral edge of the light receiving surface, perpendicularly to the light receiving surface, the transparent plates are inclined relative to said imaginary lines by the maximum value within the angular range which allows the sun rays to penetrate the capsule.

2. An apparatus as claimed in claim 1, further comprising at least one photodetector for sensing the position of the sun.

3. An apparatus as claimed in claim 2, in which each of the transparent plates of the capsule is formed convex toward the outside.

4. An apparatus as claimed in claim 2, in which each of the transparent plates of the capsule is formed concave toward the outside.

5. An apparatus as claimed in claim 4, in which the transparent plates comprise the combination of pentagonal and hexagonal transparent plates.

6. An apparatus as claimed in claim 5, in which the light receiving surface of the solar ray collector means is formed flat.

7. An apparatus as claimed in claim 1, in which the solar ray collector means has an axis for rotation about which the light receiving surface is rotatable, specific ones of the lenses which intersect said axis having a profile which resembles the profile of a convex lens.

8. An apparatus as claimed in claim 5, in which the light receiving surface of the solar ray collector has a generally partial spherical configuration.

9. An apparatus as claimed in claim 2, in which the photodetector is located outside the capsule.

10. An apparatus as claimed in claim 2, in which the photodetector is positioned inside the capsule.

11. A solar ray collection apparatus comprising:
    solar ray collector means for collecting the solar rays, said means including a plurality of lenses which define a light receiving surface; and
    a housing or capsule made up of a number of interconnected transparent plates which are interconnected to enclose the solar ray collector means thereinside, said transparent plates comprising the combination of pentagonal and hexagonal transparent plates, said transparent plates being inclined at a plurality of different angles and being configured such that, when intersected by imaginary lines which extend from the peripheral edge of the light receiving surface perpendicularly to the light receiving surface, the transparent plates are inclined relative to said imaginary lines by the maximum value within the angular range which allows the sun rays to penetrate the capsule.

12. A solar energy collection apparatus comprising:
a housing made up of a number of interconnected transparent plates, said transparent plates being inclined at a plurality of different angles such that when the solar rays are incident on the housing, the incident angle on each of said transparent plates also varies, said housing being constructed and arranged such that at least some of said transparent plates have incident angles less than a maximum angle of which solar rays are allowed to penetrate the housing, others of said transparent plates have incident angles exceeding said maximum angle at which solar rays do not penetrate the housing, and
solar ray collector means for collecting solar rays, said means being installed within the housing and including a plurality of lenses, said lenses defining a light receiving surface having a peripheral edge, said light receiving surface being constructed and arranged such that said solar rays penetrating said housing intersect said light receiving surface, said light receiving surface being further constructed and arranged such that said peripheral edge is located at a position defined substantially by the light of said maximum incident angle which penetrates said housing along imaginary lines which extend from the peripheral edge of said light receiving surface perpendicularly to said light receiving surface;
whereby the solar ray collector means collects the solar rays most effectively for a predetermined size of the capsule.

13. An apparatus as claimed in claim 12 in which said light receiving surface is generally flat, said peripheral surface being defined by a circle, said circle being defined by imaginary lines representing solar rays penetrating said housing substantially at said maximum incident angle.

14. An apparatus as claimed in claim 12, wherein said housing has a general configuration representing a portion of a sphere.

15. A solar energy collection apparatus comprising:
a housing made up of a number of interconnected transparent plates, said transparent plates being disposed at a plurality of different angles such that when the solar rays are incident on the housing, the incident angle on each of said transparent plates also varies, said housing being constructed and arranged such that at least some of said transparent plates have incident angles less than a maximum angle of which solar rays are allowed to penetrate the housing, others of said transparent plates have an incident angle exceeding said maximum angle at which solar rays do not penetrate the housing, and
solar rays collector means for collecting the solar rays, said means being installed within the housing and including a plurality of lenses, said lenses defining a light receiving surface having a peripheral edge, said light receiving surface being constructed and arranged such that said solar rays penetrating said housing intersect said light receiving surface, said light receiving surface being further constructed and arranged such that said peripheral edge is located at a position defined substantially by the light of said maximum incident angle which penetrates said housing along imaginary lines which extend from the peripheral edge of said light receiving surface perpendicularly to said light receiving surface;
whereby the solar ray collector means collects the solar rays most effectively for a predetermined size of the capsule.

16. An apparatus as claimed in claim 15, wherein said transparent plates comprise interconnected pentagonal and hexagonal transparent plates.

* * * * *